US006266916B1

United States Patent
Dugan

(10) Patent No.: US 6,266,916 B1
(45) Date of Patent: Jul. 31, 2001

(54) SOFT PLASTIC FISHING LURE WITH HIDDEN HOOK

(76) Inventor: Randal Scot Dugan, 3341 E. Hammond Cir. #C, Orange County, CA (US) 92869-7510

(*) Notice: Subject to any disclaimer, the term of this patent is extended or adjusted under 35 U.S.C. 154(b) by 0 days.

(21) Appl. No.: 09/494,390

(22) Filed: Jan. 31, 2000

(51) Int. Cl.[7] .................................................. A01K 85/00
(52) U.S. Cl. ...................... 43/42.37; 43/42.24; 43/42.06; 43/42.35; 43/42.39; 43/42.1; 43/42.41
(58) Field of Search .............................. 43/42.37, 42.38, 43/42.06, 42.35, 42.24, 42.1, 42.41, 42.39

(56) References Cited

U.S. PATENT DOCUMENTS

| | | | | |
|---|---|---|---|---|
| 534,506 | * | 2/1895 | Hastings | 43/42.37 |
| 1,890,266 | * | 12/1932 | Schadell | 43/35 |
| 2,106,755 | * | 2/1938 | McArthur | 43/42.35 |
| 2,235,600 | * | 3/1941 | Ammerman | 43/42.37 |
| 2,325,107 | * | 7/1943 | Burns | 43/42.37 |
| 2,994,982 | * | 8/1961 | Murawski | 43/35 |
| 3,413,749 | * | 12/1968 | Jeffers | 43/42.06 |
| 4,267,658 | * | 5/1981 | Brown et al. | 43/42.06 |
| 4,783,928 | * | 11/1988 | Weaver | 43/42.24 |
| 4,976,060 | * | 12/1990 | Nienhuis | 43/42.41 |
| 5,119,581 | * | 6/1992 | Rudolph | 43/42.22 |
| 5,142,810 | * | 9/1992 | Radtchenko | 43/42.04 |
| 5,367,818 | * | 11/1994 | Aduana | 43/42.44 |
| 5,628,138 | * | 5/1997 | Murray, Jr. | 43/35 |
| 5,678,350 | * | 10/1997 | Moore | 43/42.37 |
| 6,041,540 | * | 3/2000 | Potts | 43/42.24 |

\* cited by examiner

*Primary Examiner*—Kurt Rowan

(57) ABSTRACT

A fishing lure molded of flexible, translucent, soft plastic material into an integral unit in the form of a baitfish. Pigments, glitter, scent and flavor additives are mixed with the plastic during manufacture to create realistic visual, smell and taste characteristics. A wide gap offset fish hook is removably attached and substantially hidden in the lure by a hook slot in the lower longitudinal edge of the lure, and by an internal chamber. The internal chamber further serves to allow the body of the lure to collapse when attacked by a fish, exposing the point of the hook, as well as to conceal tube weights, flotation inserts, trap air contributing to the buoyancy and upright positioning of the lure, and to act as a reservoir for liquid fish attractant. The buoyancy and sink rate of the lure can be manipulated by utilizing various combinations of hook sizes, tube weight sizes, and flotation inserts positions into the internal chamber. Realistic movement of the lure is attained through the buoyancy and flexibility of the plastic material, the hydrodynamics of the design, and through rod, reel and fishing line manipulation by the angler.

2 Claims, 7 Drawing Sheets

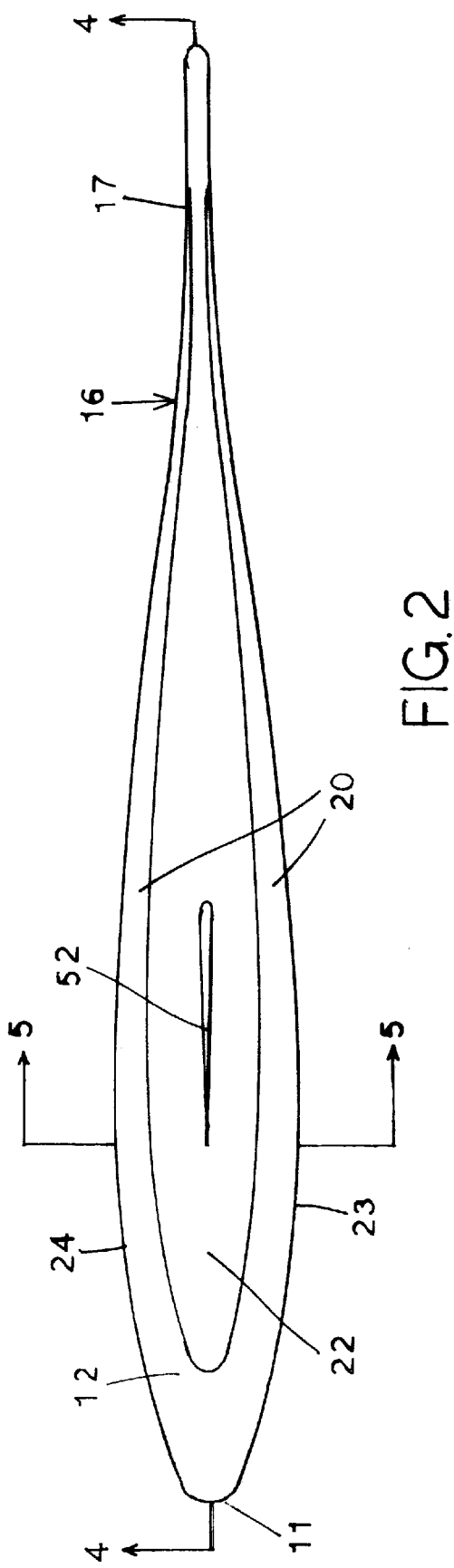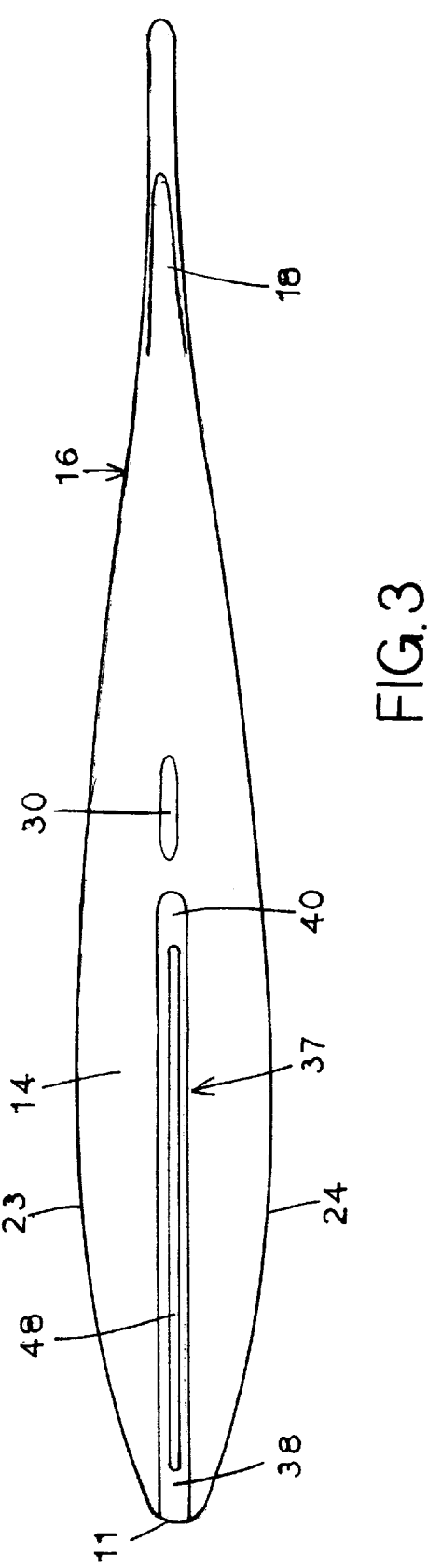

SOFT PLASTIC FISHING LURE WITH HIDDEN HOOK

BACKGROUND—FIELD OF INVENTION

This invention relates to fishing lures, specifically to an improved type of baitfish imitating fishing lure with a flexible body concealing a wide gap offset fishing hook. Presently, there are a plurality of baitfish imitating lures available to the fisherman designed to attract predatory game fish either by their shape, erratic movements, coloration, light reflecting qualities, sound, scent, or some combination of these elements. Many types of materials have been utilized in an effort to create effective and easy to use artificial baits. Lures made of wood, metal, hard plastic and soft plastic are well known and widely used. The plethora of various designs made from each of these materials is mind boggling in the least. Some have been designed to attract fish in specific situations, for example, using some type of rattle or rotating blade to create noise or vibration to attract fish in "stained" or dirty water. Others are capable of "weedless" rigging to make fishing around aquatic vegetation, flooded brush or timber, rocks and other obstacles more productive and less frustrating.

Another recent trend in fishing lures centers around the creation of baits that more accurately mimic the movements and visual appeal of a live baitfish. Many of these designs were likely born out of the on going debate over how smart fish really are, and if they become conditioned to avoid certain negative cues, particularly in very clear or heavily fished waters.

Examples of these negative cues would include the following:

a) a hook, or hooks, attached or protruding externally of the body of the lure:

b) weights or other rigging in the immediate vicinity of the lure:

c) mechanical rotating or wobbling of the lure: and d) inanimate appearance or coloration of the lure:

Numerous attempts have been made in the field of soft plastic fishing lures to eliminate these negative cues with varying degrees of success. One such design, U.S. Pat. No. 4,998,372 to Reed; Herb (Mar. 12, 1991) describes an artificial lure of soft resilient material formed into an integral elongate of an asymmetrical nature, capable of unpredictable compound movements intended to simulate a baitfish. Although this lure can be rigged in a weedless fashion, its design leaves a substantial portion of the hook visible to the fish, providing negative cues to a wary predator. Further, it lacks an internal chamber for the concealment of weights, flotation inserts, or scent and flavor enhancements.

Another such lure, U.S. Pat. No. 5,855,089 to Hockmeyer; Wayne F. (Jan. 5, 1999) describes a pliable bait minnow with life-like details and a weedless hook arrangement. The hook is attached to the nose portion of the lure via a wire coil. This method of hook attachment is not advantageous due to its visibility to the fish, and its position in front of the bait can result in missed hook ups when a fish strikes the body of the bait and not the hook on front of the lure. Additionally, it also lacks an internal chamber.

A weedless fish lure, described in U.S. Pat. No. 4,976,060 to Nienhuis; James I. (Dec. 11, 1990) consists of a pliable body with upper and lower longitudinal alignment grooves for concealing the hook and providing weedless operation. This arrangement, with the upper groove opening on the top portion of the lure makes it unsuitable for the addition of flotation devices or fish attracting scent and flavor enhancements.

Another weedless fishing lure, U.S. Pat. No. 4,054,004 to Schott; William Donald (Oct. 18, 1977) teaches a lure made of a semi-rigid plastic tube with a removably mounted head. This invention requires a specially made hook with a permanently attached disk to maintain the position of the hook in relation to the aperture in the body.

A plastic minnow, U.S. Pat. No. 3,748,774 to Bryant; Sherman G. (Jul. 31, 1973) describes a lure constructed of a sinkable soft plastic in its body portion combined with a dorsal fin and attachable eyes made of floater plastic. This combination is intended to keep the bait in a constant upright position when in use. The hook is concealed within the body by a groove in its lower most portion. This arrangement provides no means for manipulation of the buoyancy of the lure by the addition of weight or flotation devices. It also lacks an internal chamber for the employment of liquid fish attractant.

U.S. Pat. No. 3,861,075 to Ingram; Alexander John (Jan. 21, 1975) teaches of a lure in the form of a fish made of a flexible material with a hollow interior. Its upper and lower interior compartments communicate with the outside through an opening in the mouth region of the lure. This arrangement inhibits the use of liquid fish attractant to create a scent trail. Additionally, no provision is made to rig the lure for weedless operation. Another bait fish imitator, U.S. Pat. No. 5,678,350 to Moore; Mark H. (Oct. 21, 1997) describes a lure of flexible material with a hinged body to mimic swimming motion, and reflective material imbedded in the body to imitate the coloration of living fish. No means are provided for adjustment of the lures buoyancy by the angler, or for weedless rigging.

Additional references cited are found in the 1999 Spring Fever mail order catalog from Bass Pro Shops (Jan. 2, 1999).

On page 102 of the catalog, lures of the tube bait genre are shown from several manufacturers. These lures are hollow, soft plastic "tubes" with tentacle like tails. They are frequently rigged with an offset worm hook and a tube weight, or stuffed with packaging "peanuts" to control their buoyancy. Although these lures can be effective at times, they show little resemblance to a baitfish, and when rigged a substantial portion of the hook is visible, giving negative cues to a potential victim fish.

On page 104 the Bass Pro Shops® Shadee Shad™ is offered. This lure is of the genre of baits often referred to as "pot bellies soft jerk baits". Lures of this type are available from many soft plastic lure manufacturers and all feature of a deep hook slot in their lower longitudinal edge to conceal a larger portion of the hook and improve the hook setting performance of the lure. This design fails to include an internal chamber for concealing a tube weight or flotation inserts, or for retaining liquid fish attractant. The following items appear in this specification and are included here for the examiners information. They also appear in the 1999 Spring Fever mail order catalog from Bass Pro Shops (Jan. 2, 1999).

On page 120 the XPS™ Tube Weight is offered. These weights are inserted into tube style lures and feature an eye through which a hook is threaded in order to secure the weight inside the lure. Hereafter this item will be referred to as a "tube weight".

The type of hook referred to in the following specification is available from many hook manufacturers. They all feature a wide gap offset worm hook design and are available in several sizes and wire gauges. Some examples include the Gamakatsu® Superline Worm Hook™ model #744 shown on page 123, the Owner® Rig-N-Hook™ model #5137 shown on page 124, and the Mustad® Mega-Bite Worm Hook™ offered on page 125. Hereafter this style of hook will be referred to as a "wide gap offset fish hook".

On page 138 a variety of fish attractants available in several flavors are shown such as Uncle Buck's® Hawg Scent™ and Fish Formula®. Hereafter these attractants will be referred to as "liquid fish attractant".

SUMMARY INCLUDING OBJECTS AND ADVANTAGES

A soft plastic fishing lure with a hidden hook comprising: a body molded in the form of a baitfish from soft, flexible, plastic material mixed with pigments, glitter, scent and flavor additives to make the lure attractive to predatory game fish, has an internal chamber that conceals the curved portion of the hook, hides tube weights, traps air contributing to the buoyancy of the lure, conceals flotation inserts and acts as a reservoir for liquid fish attractant, the internal chamber is accessed through an opening located in the lower aft portion of the abdomen. A hook slot is provided in the lower longitudinal edge of the lure to conceal the shank of the hook. The lures sink rate and buoyancy can be manipulated by using various hook, tube weight, and flotation insert combinations.

OBJECTS AND ADVANTAGES

Accordingly, several objects and advantages of my invention are as follows: to provide the fisherman with an inexpensive soft plastic fishing lure that mimics the appearance and movements of a baitfish, utilizes readily available wide gap offset fish hooks, tube weights, flotation inserts, and liquid fish attractants, can easily be rigged to fish the entire water column from top to bottom, and eliminates the negative cues that make fish difficult to catch, particularly in areas that receive heavy fishing pressure or have very clear water.

Still further objects and advantages will become apparent from a consideration of the ensuing description and accompanying drawings.

BRIEF DESCRIPTION OF THE DRAWINGS

FIG. 2 is a top plan view of the present invention.

FIG. 3 is a bottom plan view of the present invention.

PREFERRED EMBODIMENT—DESCRIPTION

Figure 1:
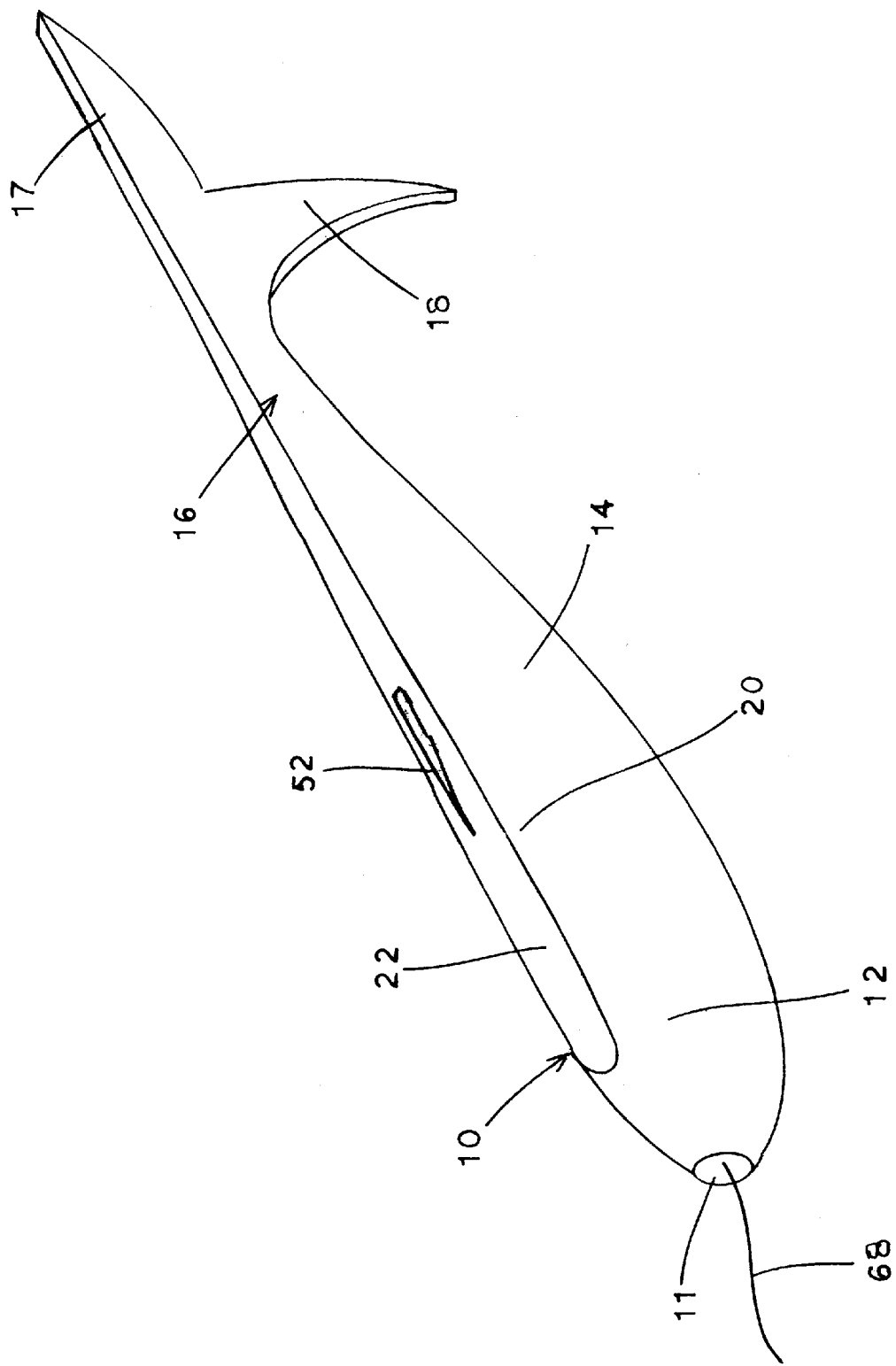
FIG. 1 is a perspective view of the present invention.

Referring to FIGS. 1 through 5, a lure 10, in the shape of a baitfish is molded from a soft, flexible, translucent, plastic material to form an integral unit. The plastic material may be mixed with coloring pigments, glitter, scent and flavor additives to produce the desired buoyancy, flexibility, visual, taste and smell characteristics. The external features of the lure includes a head 12, an abdomen 14, a tail 16, an upper tail fin 17, and a lower tail fin 18. The upper portion of the lure is defined by a flat top 22, which extends from the forward portion of a back 20, to the end of the upper tail fin. The lower portion of the lure is defined by a downward arc which begins at a nose 11, continues through the head and abdomen portions, then ascends upward to join the tail section. A left side 23, and a right side 24, shown in FIGS. 2, 3, and 5, feature convex surfaces to further enhance the baitfish imitating shape of the lure.

Figure 4:
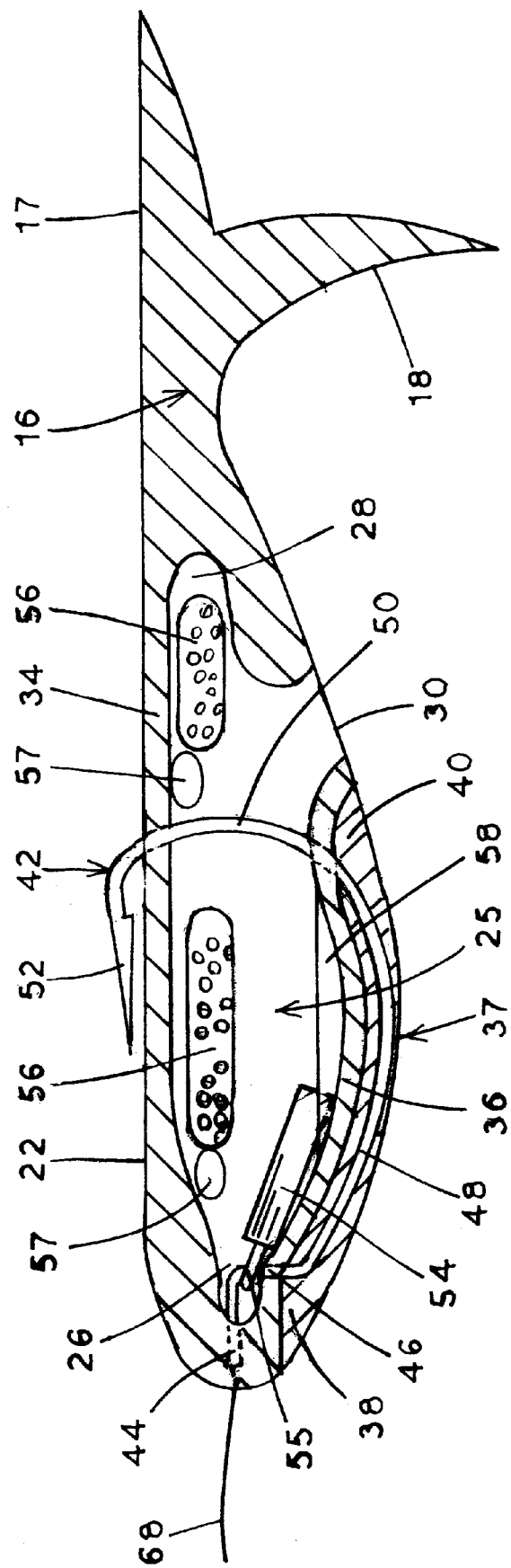
FIG. 4 is a longitudinal view in cross section taken along line 4—4 as shown in FIG. 2.
Figure 5:
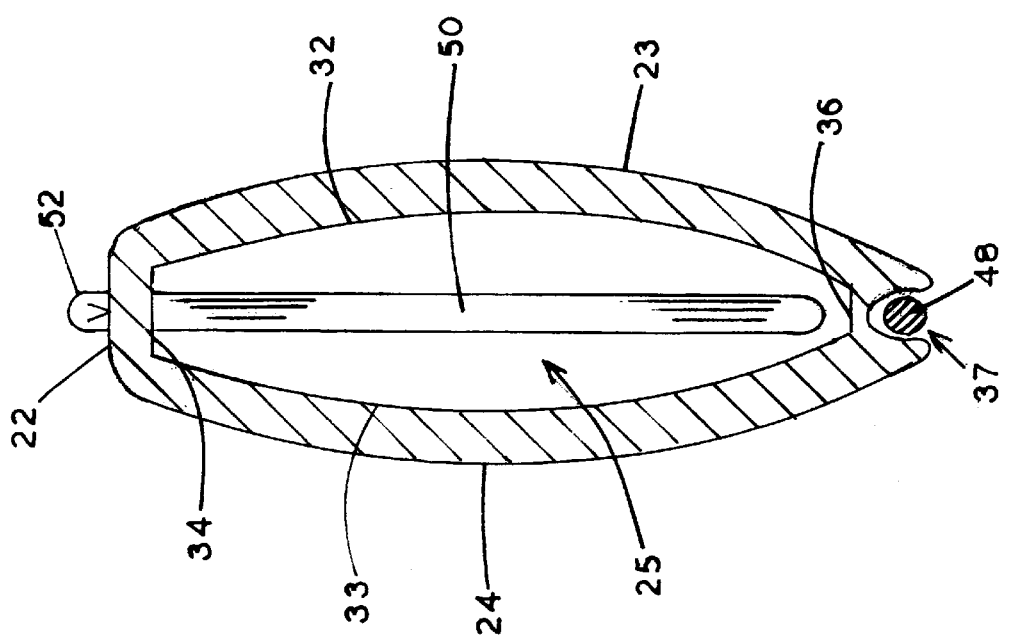
FIG. 5 is an enlarged forward elevational view in cross section taken along line 5—5 as shown in FIG. 2.

Referring to FIGS. 4 and 5 an internal chamber 25, features a forward portion of internal chamber 26, and an aft portion of internal chamber 28, communicating with the outside through an aperture or internal chamber opening 30, located in the lower aft area of the abdomen 14. The internal chamber is further defined by a left side internal chamber wall 32, and a right side internal chamber wall 33, shown in the enlarged front elevational view in cross section of FIG. 5. An upper internal chamber wall, or a internal chamber ceiling 34, and a lower internal chamber wall, or internal chamber floor 36, are shown in FIGS. 4 and 5. Also shown in FIGS. 4 and 5, an air bubble 57, which is trapped against internal chamber ceiling 34, and a liquid fish attractant 58, which is introduced into the internal chamber 25 through internal chamber opening 30.

A longitudinal groove, or hook slot 37, shown in FIGS. 3, 4, and 5, is located in the lower longitudinal edge of the lure, with a forward portion of hook slot 38 beginning under the nose, and an aft portion of hook slot 40, terminating forward of the internal chamber opening 30.

Referring to FIG. 4, a wide gap offset fish hook 42 is shown as it would appear when properly rigged in the lure 10. The hook features an eye of hook 44, an offset portion of hook 46, a shank of hook 48, a curved portion of hook 50, and a pointed portion of hook 52. A tube weight 54, is a commercially available item that comes in various weights and features an eye of insert weight 55, through which the hook is threaded. A flotation device, or flotation insert 56, made of buoyant non-water soluble foam or other suitable buoyant material, may be positioned in the internal chamber 25 forward of the curved portion of the hook 50, or it may be inserted in the aft portion of the internal chamber 28.

Figure 6:
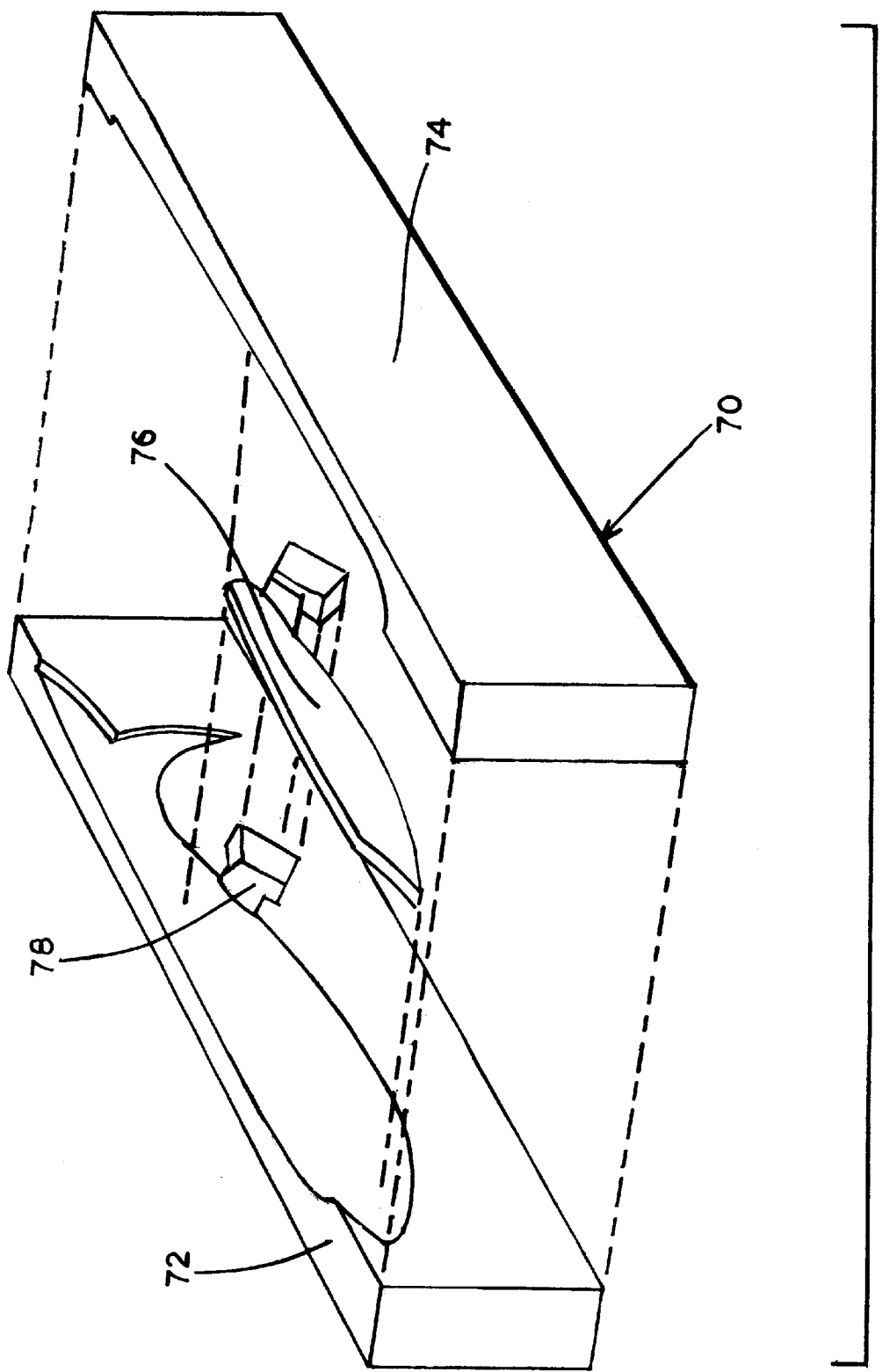
FIG. 6 is an exploded view in perspective of the mold apparatus for the preferred embodiment of the present invention.
Figure 7:
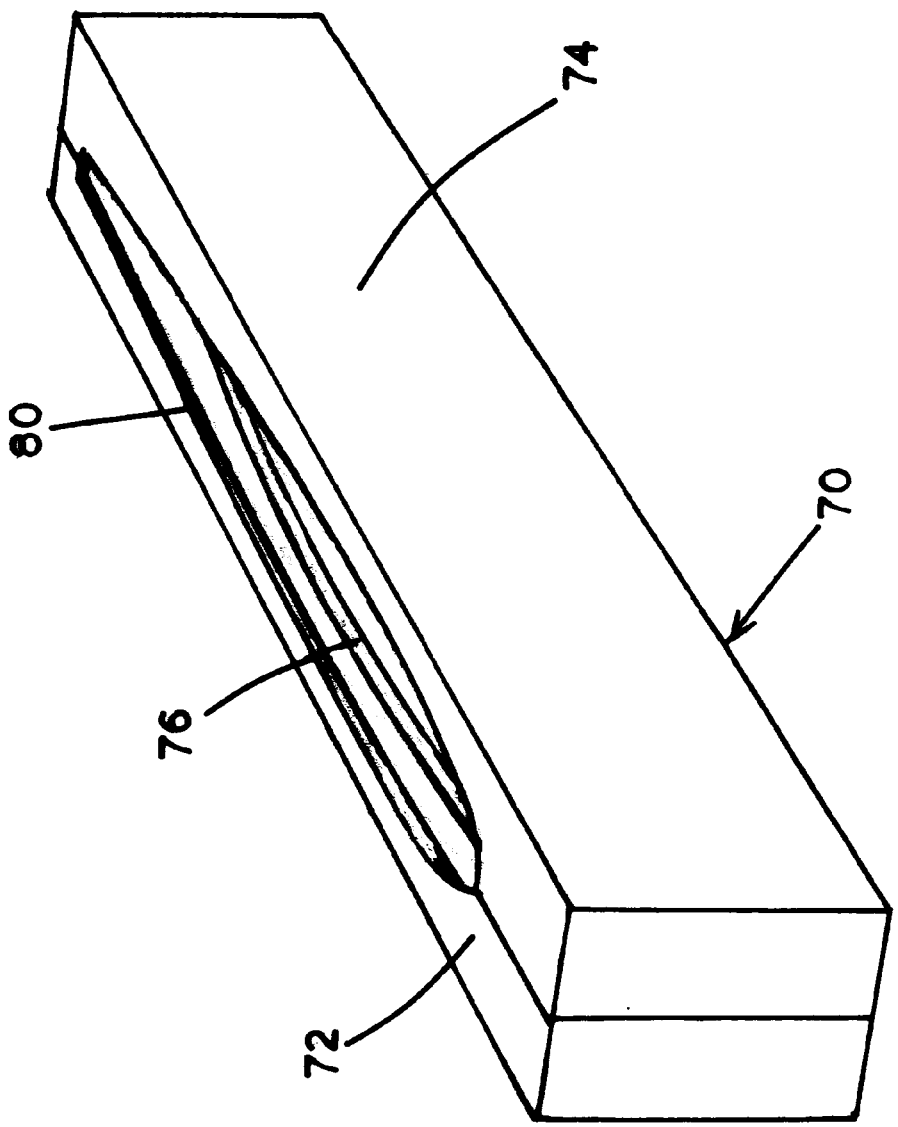
FIG. 7 is a perspective view of the mold apparatus for the preferred embodiment of the present invention.

Referring to FIG. 6, an exploded perspective view of a mold apparatus 70 for manufacture of the preferred embodiment of the present invention is shown. The mold may be made of metal, silicone, or other suitable material and features a right side of mold apparatus 72, which contains the cavity for forming the corresponding right side of the present invention, and a left side of mold apparatus 74, which contains the cavity for forming the corresponding left side of the present invention. A mold apparatus insert 76, for forming the internal chamber 25 shown in FIGS. 4 and 5, is aligned into a mold apparatus insert cavity 78, as the right side of mold apparatus 72, and the left side of mold apparatus 74 are brought together. Referring to FIG. 7, the right side of mold apparatus 72, left side of mold apparatus 74, and mold apparatus insert 76 are assembled. A mold apparatus opening 80 is formed on the top of the mold through which the melted plastic is poured. After the plastic material has cooled, the mold apparatus 70 is disassembled and the lure 10 is removed from the mold. Mold apparatus insert 76 is then removed from the lure 10.

PREFERRED EMBODIMENT—OPERATION

Operation of the invention begins with preparing the lure 10. A fishing line 68 is tied to the wide gap offset fish hook 42 at eye of hook 44. A tube weight 54, is selected by the angler if desired and inserted into the internal chamber 25 through the internal chamber opening 30. The eye of tube weight 55, is positioned in the forward portion of internal chamber 26. The pointed portion of hook 52 is piercibly inserted into center of nose 11. Upon entering forward portion of internal chamber 26 the pointed portion of hook 52 is rotated downward and through the eye of tube weight 55, then exits the lure at the forward portion of hook slot 38. The hook is then rotated 180 degrees as it is passed through the lure so that the offset portion of hook 46, secures the tube weight 54 in the forward portion of internal chamber 26. At this time a flotation insert 56 can be inserted into internal chamber 25, or the aft portion of internal chamber 28. The pointed portion of hook 52 is then piercibly and vertically inserted at aft portion of hook slot 40, through internal chamber floor 36, up into internal chamber 25. As curved portion of hook 50 enters internal chamber 25, hook shank 48 is aligned into hook slot 37. Pointed portion of hook 52 is then piercibly and vertically inserted through internal chamber ceiling 34, and aligned horizontally with top 22. If fishing around vegetation, brush, or other obstacles, the pointed portion of hook 52 may be reinserted into top 22 using a technique known as "skin-hooking" thereby making the lure completely weedless. Liquid fish attractant 58 can be added to the internal chamber as needed through internal chamber opening 30. Another benefit of the internal chamber 25, and the location of the internal chamber opening 30, is the ability of the arrangement to trap an air bubble 57, contributing to the buoyancy of the lure, and assisting the lure in maintaining an upright position while in use.

As seen in FIG. 4, rigging of the lure in this manner conceals the majority of the hook, as well as tube weight 54 and flotation insert 56, thus eliminating what were previously negative visual cues. In addition, when a fish bites the lure, the use of the wide gap offset hook allows for a more complete collapse of the top 22, left side 23, and right side 24, insuring a better hook-set and less lost fish.

In use, the lure is very versatile and can be used in many ways. The buoyancy and sink rate can easily be manipulated by utilizing different hook, tube weight, and flotation insert combinations, making the lure suitable for a wide variety of techniques and presentations. Although the lure was developed and field tested specifically for catching largemouth bass, it is the inventors opinion that the lure could be effective on other game fish species as well.

For top water fishing, the lure would be rigged with a very light tube weight, or none at all. The lure would be cast into the target zone, then a "twitch and pause" type retrieve could be used to attract a fish to the lure. By varying the speed and intensity of the retrieve, the lure can be made to zig-zag on the surface of the water in a "walk the dog" action, or the technique known as "dead sticking" could be used, were the lure is retrieved up to a potential hiding spot of a fish, then the retrieve is stopped and the lure is allowed to slowly sink into the fishes lair.

Another method that proved very effective in field testing involved targeting fish in heavy cover. The techniques of "pitching and flipping" were used to present the bait at close range into flooded trees, brush, and reeds. Rigging the lure for this technique is the same as previously described, except a larger tube weight can be used to facilitate easier casting, and the hook can be "skin hooked" to make the lure completely weedless. Again, the lures buoyancy and sink rate can be manipulated to find the most effective presentation in any given situation.

For fishing deeper structures such as rock piles, points and ledges, the techniques of "split-shoting" and "carolina rigging" were utilized. When split-shoting, no tube weight is used, the hook is rigged as previously described, and flotation inserts are inserted into the internal chamber. Split shot weight is pinched on to the line several inches to several feet above the lure. This allows the lure to float above the bottom, imitating a distressed baitfish. In carolina rigging, the lure, hook, and flotation inserts are arranged the same way as in split-shoting, except a large egg sinker is used in conjunction with a glass bead, a swivel, and a leader.

OTHER EMBODIMENTS

Life-like detailed version of lure—Description

Figure 8:
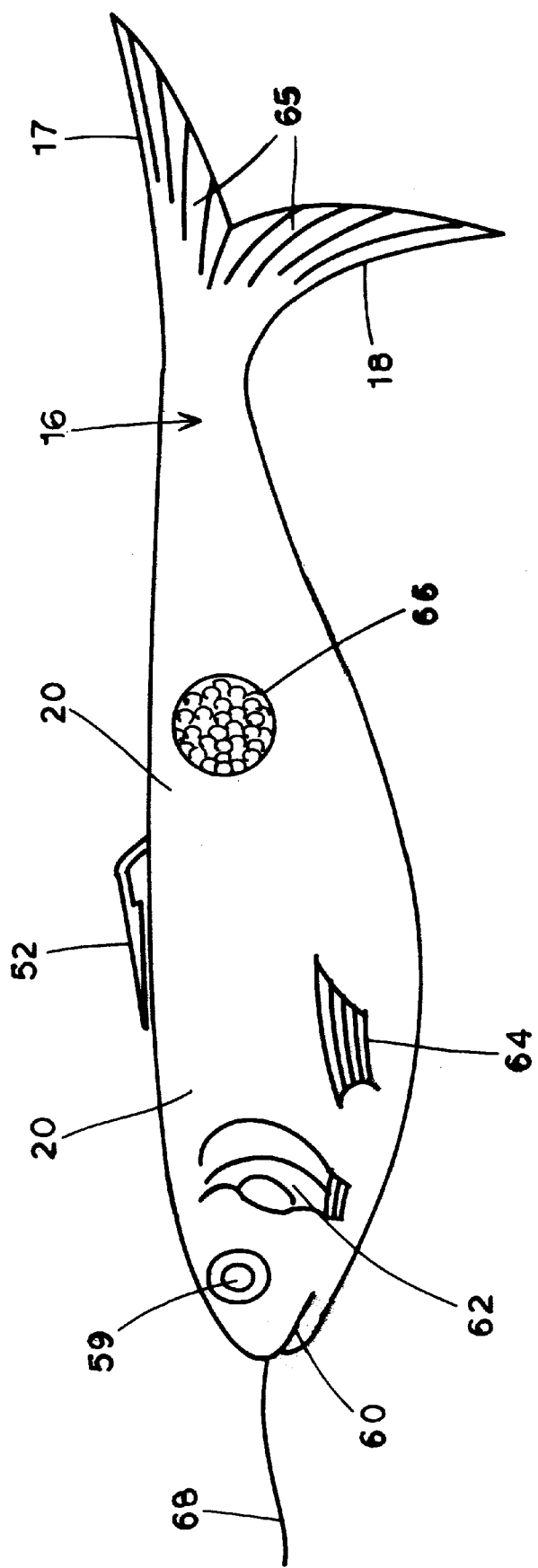
FIG. 8 is a side elevational view of another embodiment of the present invention.

Referring to FIG. 8, another embodiment of the lure is shown. The back 20, is arched slightly from the nose 11 to its junction with the tail 16, upper tail fin 17 slopes upward slightly to its end. Additional details are molded in relief and include an eye 58, a mouth 60, a gill plate 62, a pectoral fin 64 and rays 65 on upper and lower tail fins. The body of the lure is textured to resemble scales 66.

Life-like detailed version of lure—Operation

Operation of the lure would be the same as in the preferred embodiment, and all rigging options would also be unchanged.

CONCLUSION, RAMIFICATIONS, AND SCOPE

Accordingly, it can be seen that according to the invention, a fishing lure is provided that provides the realistic appearance of a baitfish, eliminates negative cues that cause fish to reject a bait, is easily manipulated to produce life-like movement, and can be fished throughout the water column by altering the lures fall rate and buoyancy characteristics. Further, a lure is provided that is inexpensive, is simple to manufacture and use, and utilizes readily available wide gap offset fish hooks, tube weights, flotation inserts and liquid fish attractant.

Although the description above contains many specificities, these should not be construed as limiting the scope of the invention but as merely providing illustrations of some of the presently preferred embodiments of the this invention. Various other embodiments and ramifications are possible within its scope. For example, the invention could take on the shape of other types forage fish, or other aquatic animals such as crayfish, shrimp, or squid.

Thus the scope of the invention should be determined by the appended claims and their legal equivalents, rather than by the examples given.

REFERENCE NUMERALS 10 lure
11 nose
12 head
14 abdomen
16 tail
17 upper tail fin
18 lower tail fin
20 back
22 top
23 left side
24 right side
25 internal chamber
26 forward portion of internal chamber
28 aft portion of internal chamber
30 internal chamber opening 32 left side internal chamber wall
33 right side internal chamber wall
34 internal chamber ceiling
36 internal chamber floor
37 hook slot
38 forward portion of hook slot
40 aft portion of hook slot
42 wide gap offset fish hook
44 eye of hook
46 offset portion of hook
48 shank of hook
50 curved portion of hook
52 pointed portion of hook
54 tube weight
55 eye of tube weight
56 flotation insert
57 air bubble
58 liquid fish attractant
59 eye
60 mouth
62 gill plate
64 pectoral fin
65 rays
66 scales
68 fishing line
70 mold apparatus
72 right side of mold apparatus
74 left side of mold apparatus
76 mold apparatus insert
78 mold apparatus insert cavity
80 mold apparatus opening

What is claimed is:

1. A fishing lure with a hidden hook, molded of flexible plastic in the form of a bait fish comprising:

a head, a back, an abdomen, and a tail, an offset fish hook, said fish hook including an eye, an offset portion, a shank, a curved portion, and a pointed portion, a weight, said weight including an eye, said lure containing an internal chamber, said internal chamber including a forward portion, for receiving said eye of the weight, an internal chamber ceiling and a floor, and an internal chamber opening, providing access to said internal chamber, said weight contained in said internal chamber, and, a hook slot extending along an outer lower edge of said lure, said hook slot aligned below said portions of said internal chamber, said hook slot and said internal chamber separated by said internal chamber floor, said eye of the weight is mounted on said offset portion of the hook, within said forward portion of the internal chamber, said offset portion of the hook penetrating said internal chamber floor, at a forward portion of said hook slot, said shank of the hook mounted in and concealed by said hook slot, said curved portion of the hook concealed in said internal chamber, said pointed portion of the hook aligned above and along a top edge of said back.

2. The fishing lure with a hidden hook as defined in claim 1 wherein said internal chamber opening is located along a lower edge of said lure.

\* \* \* \* \*